(12) United States Patent
Sanemitsu

(10) Patent No.: US 6,209,043 B1
(45) Date of Patent: Mar. 27, 2001

(54) COMMAND-CONTROLLABLE IC MEMORY WITH COMPATIBILITY CHECKING UNIT SUSPENDING MEMORY OPERATION/ ENABLING DATA TO BE ONLY READ FROM MEMORY WHEN IC MEMORY OPERATION IS HOST INCOMPATIBLE

(75) Inventor: Yoshikado Sanemitsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,642

(22) Filed: Oct. 30, 1998

(30) Foreign Application Priority Data

May 26, 1998 (JP) ................................. 10-143953

(51) Int. Cl.[7] .............................. G06F 3/00; G06F 13/00; G06F 13/374; G06F 15/177; G05B 13/02
(52) U.S. Cl. .................................... 710/5; 710/2; 710/14; 700/31
(58) Field of Search ..................... 710/5, 14, 2; 364/151, 364/488; 700/31

(56) References Cited

U.S. PATENT DOCUMENTS

| | | | |
|---|---|---|---|
| 5,768,632 | * | 6/1998 | Husted et al. ........................ 364/151 |
| 5,892,683 | * | 4/1999 | Sung ..................................... 364/488 |
| 5,968,141 | * | 10/1999 | Tsai ......................................... 710/14 |
| 5,974,478 | * | 8/2000 | Wood et al. ............................. 710/22 |
| 6,038,400 | * | 3/2000 | Bell et al. ............................... 326/37 |
| 6,078,967 | * | 6/2000 | Fulghum ................................. 710/2 |
| 6,078,968 | * | 6/2000 | Lo et al. .................................. 710/5 |
| 6,094,691 | * | 7/2000 | Burgard ................................. 710/14 |
| 6,108,719 | * | 8/2000 | Klein ..................................... 710/10 |

FOREIGN PATENT DOCUMENTS 57-006491   1/1982   (JP).
6-259982    9/1994   (JP).

* cited by examiner

Primary Examiner—Thomas Lee
Assistant Examiner—Tanh Nguyen

(57) ABSTRACT

An IC memory device and method of determining whether IC memory operation is compatible with a host system are provided such that the host system need not store information for identifying a large number of compatible IC memory chips, the host system need not determine whether IC memory is operationally compatible with the host system, and host system operation can thus be simplified. The manufacturer codes and device codes of compatible IC memory chips are compiled in a device ID table stored in a table storage unit. The IC memory device internally determines whether the manufacturer code and device code supplied by a host system are contained in the device ID table to determine whether the host system can operate the IC memory.

12 Claims, 9 Drawing Sheets

COMMAND-CONTROLLABLE IC MEMORY WITH COMPATIBILITY CHECKING UNIT SUSPENDING MEMORY OPERATION/ ENABLING DATA TO BE ONLY READ FROM MEMORY WHEN IC MEMORY OPERATION IS HOST INCOMPATIBLE

BACKGROUND OF THE INVENTION

1. Field of the Invention

The present invention relates to a command-controllable integrated circuit (IC) memory device such as a flash memory and, also, to a method for determining the operational compatibility of the IC memory device with a host system.

2. Description of the Prior Art

FIG. 9 is a block diagram of a conventional IC memory device using M5M29F016 flash memory manufactured by Mitsubishi Denki Kabushiki Kaisha. Note that this IC memory device 100 is used in the form as connected to a host system 110 that controls operation of the IC memory device 100. A manufacturer code and device code, which are used for determining whether the host 110 is operationally compatible with the IC memory device 100, are stored at a specific address in the status/ID register 103 of the flash memory. In the example shown, the manufacturer code 1Ch, for example, is stored at address 000000h, and the device code DAh is stored at address 000001h.

The operating mode of the IC memory device 100 is set using commands written to the command user interface (CUI) 102 by the host 110. One method whereby the host 110 can determine the compatibility of the IC memory device 100 is to apply a specific command, for example, a command 90h in this example, to the CUI 102 of the IC memory device 100 to read the manufacturer code 1Ch and the device code DAh from the status/ID register 103.

The host 110 then determines whether the IC memory device 100 is compatible based on the manufacturer code 1Ch and the device code DAh returned from the IC memory device 100. It should be noted that the device codes used for this determination are not limited to codes defined by the Joint Electron Device Engineering Council (JEDEC), and can be any particular code system. The code size is also not specifically limited.

There are cases, however, in which the manufacturer code 1Ch and the device code DAh are set to different values in different IC memory devices that operate according to the same algorithm, use the same commands, and are operationally compatible. An example of such a case is an IC memory device that has been simply reduced in size. The host 110 must therefore recognize these as different IC memory devices, even though the operating algorithms are the same, and devices which are identical in every way except for the manufacturer are assigned different, discrete manufacturer and device codes.

A problem with this method of determining device compatibility is that as a result of using the manufacturer and device codes to determine operational compatibility, a host 110 must specifically recognize the device code of every device with which it is compatible, that is, a potentially large number of codes.

A further problem is that for a host 110 to use the latest IC memory devices, it must also be compatible with the latest manufacturer and device codes.

It should be noted that Japanese Patent Laid-Open Publication No. 57-6491 teaches a semiconductor device that internally compares an identification code written to ROM with an internal identification code, and outputs a specific value when the comparison matches. Note, however, that this semiconductor device does not exchange identification code information with the host.

Note, further, that Japanese Patent Laid-Publication 6-259982 teaches a method and apparatus for rewriting a flash ROM device with the objective of preventing rewrite errors by comparing internal fixed information with information in the rewrite request signal applied from an external device, and returning a specific value to the external device when a match is confirmed.

There is therefore a need for IC memory whereby it can be determined in the IC memory whether the memory is compatible with the manufacturer and device codes of the host.

There is also a need for IC memory whereby compatibility can be determined without it being necessary for the host to store manufacturer and device codes for every IC memory device with which it is compatible.

There is a further need for IC memory whereby host operation can be simplified, and a method for determining operational compatibility of IC memory addressing these needs.

SUMMARY OF THE INVENTION

To meet the above described needs, an IC memory device according to the present invention comprises command-controllable memory and is controlled by a host system. The IC memory device comprises a compatibility information storage unit in which compatibility information is prestored, an identification information storage unit for storing IC memory identification information supplied from a host system, a compatibility checking unit, and a compatibility check result storage unit for storing the result determined by the compatibility checking unit. The compatibility information comprises information for identifying one or more operationally compatible IC memory chips. The compatibility checking unit determines compatibility with host system operation by determining whether the identification information stored to the identification information storage unit is contained in the compatibility information. In response to a request received from the host system, the compatibility check result storage unit supplies the stored result of the compatibility check to the host system.

With the IC memory device according to the present invention, It is therefore not necessary for the host to store a large number of manufacturer codes and device codes. The host can simply read the result of a compatibility check from the IC memory device, and it is therefore not necessary for the host to determine whether it is compatible with a specific IC memory device connected thereto. As a result, the operation of the host can be simplified.

An IC memory device according to another aspect of the present invention is a command-controllable IC memory device comprising a memory unit for storing data from a host system where the IC memory device is controlled by the host system. This IC memory device comprises a compatibility information storage unit in which compatibility information is prestored, an identification information storage unit for storing IC memory identification information supplied from a host system, and a compatibility checking unit for determining compatibility with host system operation by determining whether the identification information stored to the identification information storage unit is contained in the compatibility information. The compatibility information in this aspect of the present invention is also information for identifying one or more operationally compatible IC memory chips.

The compatibility checking unit in this case can supply a specific signal based on a result of a compatibility check to the host system. Alternatively, the compatibility checking unit can stop operation of the memory unit when IC memory operation is determined not compatible with the host system, or can enable data to be only read from the memory unit when IC memory operation is determined not compatible with the host system.

The compatibility information storage unit can alternatively be provided in the memory unit. In this case, the compatibility checking unit determines compatibility with host system operation by reading compatibility information from the memory unit, and determining whether the identification information stored to the identification information storage unit is contained in the compatibility information.

With the IC memory device according to the present invention, It is therefore not necessary for the host to store a large number of manufacturer codes and device codes. The host can simply read the result of a compatibility check from the IC memory device, and it is therefore not necessary for the host to determine whether it is compatible with a specific IC memory device connected thereto. As a result, the operation of the host can be simplified.

When the compatibility checking unit of the IC memory device is designed so as to notify the host system of the compatibility check result by supplying a specific signal based on the result of the compatibility check to the host system, the host system does not need to perform a special operation to obtain the compatibility check result. Host system operation can therefore be further simplified.

If the compatibility checking unit is designed so as to stop memory unit operation when the IC memory is determined not compatible with the host system, the host can determine whether the IC memory can be used by attempting to access the IC memory normally. It is therefore not necessary for the host system to perform a special operation to obtain the result of a compatibility check, and host operation can therefore be further simplified.

If the compatibility checking unit is designed so as to prohibit all operations other than reading data when the IC memory is determined not compatible with the host system, the host can determine whether the IC memory is compatible by attempting to write to the IC memory normally. The host system therefore need not perform a special operation to obtain the result of a compatibility check, and host operation can therefore be further simplified.

By including the compatibility information storage unit in the memory unit, and driving the compatibility checking unit to read the compatibility information from the memory unit irrespective of data or command signal input from the host system during the compatibility check, it is not necessary to provide separate memory for storing the compatibility information.

An operational compatibility checking method for IC memory according to the present invention applies to command-controllable IC memory comprising a memory unit for storing data from a host system where the IC memory device is controlled by the host system. The compatibility checking method comprises steps for supplying IC memory identification information from a host system, determining whether said supplied identification information is contained in predefined compatibility information as described above, and determining compatibility with the host system based on the result of determining whether the supplied identification information is contained in the predefined compatibility information.

With this method, the result of a compatibility check can be supplied to the host system in response to a request from the host system, or a specific signal based on the result of a compatibility check can be supplied to the host system.

In either case, this method can also either stop operation of the memory unit, or can allow data to only be read from the memory unit, when IC memory operation is determined not compatible with the host system.

The benefits and effects obtained by the operational compatibility checking method of the present invention are as described above with respect to the various versions of IC memory devices according to the present invention, and further description thereof is thus omitted below.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DETAILED DESCRIPTION OF THE EMBODIMENTS

Embodiment 1

Figure 1:
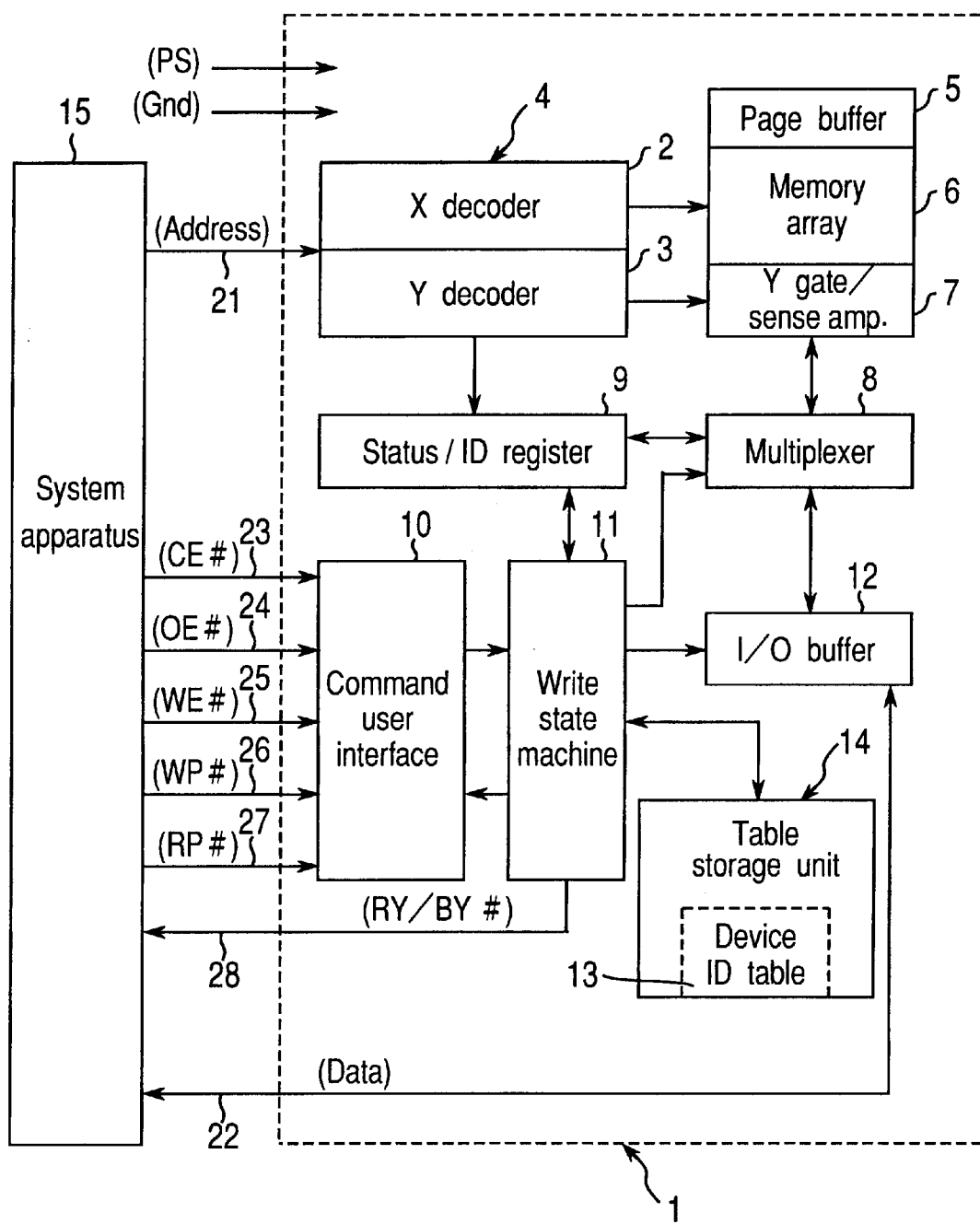
FIG. 1 is a block diagram of an IC memory exemplary of a first embodiment of the present invention.

FIG. 1 is a typical block diagram of an IC memory device exemplary of a first embodiment of the present invention wherein M5M29F016 flash memory manufactured by Mitsubishi Denki Kabushiki Kaisha is used for the IC memory.

Referring to FIG. 1, the IC memory device 1 is command-controllable memory comprising an address decoder 4, a page buffer 5, memory array 6, a Y-gate sense amplifier 7, a multiplexer 8, a status/ID register 9, a command user interface (CUI) 10, a write-state machine (WSM) 11, an input/output buffer 12, and a table storage unit 14. The table storage unit 14 holds a device ID table 13. The device ID table 13 is a listing of device codes used to identify the manufacturer and device codes of compatible IC memory using the same operating algorithm.

The address decoder 4 comprises an X decoder 2 and a Y decoder 3 for decoding address data supplied from an external source. The address decoder 4 is further connected to an external host 15, which controls the IC memory device 1 using an address supplied via an address bus 21 to the address decoder 4. The I/O buffer 12 and write-state machine 11 are also connected to the host 15 via a data bus 22 and control signal line 28, respectively.

The CUI 10 receives a chip enable signal CE#, output enable signal OE#, write enable signal WE#, write protect signal WP#, and reset/power-down signal RP# from the host 15 by way of respective control signal lines 23, 24, 25, 26, and 27. The write-state machine 11 appropriately supplies a specific ready signal RY or busy signal BY# to the host 15 via the control signal line 28. It should be noted that the hash mark (#) suffixed to the chip enable signal CE#, output enable signal OE#, write enable signal WE#, write protect signal WP#, reset/power-down signal RP#, and busy signal BY# indicates that the corresponding signal is low active.

The X decoder 2 is connected to the memory array 6, and the Y decoder 3 is connected to the Y-gate sense amplifier 7. The address decoder 4 is further connected to the status/ID register 9. The memory array 6 is connected to the page buffer 5 and Y-gate sense amplifier 7. The Y-gate sense amplifier 7 is connected to the I/O buffer 12 through the multiplexer 8. The CUI 10 is also connected to the write-state machine 11, which is connected to the multiplexer 8, status/ID register 9, I/O buffer 12, and table storage unit 14. The multiplexer 8 is further connected to the status/ID register 9.

The X decoder 2 decodes the X address, and the Y decoder 3 likewise decodes the Y address, in the address data supplied from the host 15 via the address bus 21. The X address value decoded by the X decoder 2 is stored to the memory array 6, and the Y address value decoded by the Y decoder 3 is applied to the Y-gate sense amplifier 7.

The page buffer 5 is buffer memory for temporarily storing data loaded for data writing operations. The Y-gate sense amplifier 7 amplifies the data output voltage from the memory array 6. The multiplexer 8 selects data from the Y-gate sense amplifier 7 and status/ID register 9, and the I/O buffer 12 controls data input/output between the multiplexer 8 and the data bus 22.

It should be noted that except for the method of determining memory compatibility, the IC memory device 1 according to the present invention accomplishes such operations as data reading, writing, and erasing using existing known methods, and further description thereof is omitted below.

The method of determining the compatibility of IC memory device 1 with the connected host 15 is described next below.

The CUI 10 drives the write-state machine 11 according to the command(s) indicated by the control signal(s) supplied via the control signal lines 23–27. The write-state machine 11 thus initiates operation as instructed by the CUI 10, and appropriately drives the multiplexer 8, status/ID register 9, I/O buffer 12, and table storage unit 14. When the host 15 issues a command requesting the CUI 10 to perform the identification operation used for a compatibility check, the CUI 10 operates the write-state machine 11 to perform the compatibility check.

The write-state machine 11 stores the manufacturer code and device code input from the data bus 22, I/O buffer 12, and multiplexer 8 to the status/ID register 9. The table storage unit 14 is ROM. The device ID table 13 stored to this ROM is the manufacturer code and device code information of the IC memory chips that are operationally compatible with the IC memory device 1. It should be noted that the table storage unit 14 can be EEPROM, flash memory, or other type of nonvolatile memory.

The write-state machine 11 determines whether the manufacturer code and device code supplied from the host 15 and stored to the status/ID register 9 is also contained in the device ID table 13. If the codes are in the device ID table 13, the write-state machine 11 sets a specific flag, such as 00h, in the status/ID register 9; if the codes are not contained, the write-state machine 11 sets a different specific flag, such as FFh, in the status/ID register 9.

The host 15 then simply reads the flag set to the status/ID register 9. If the read flag is 00h, in this example, the host 15 knows that the IC memory device 1 is compatible IC memory and thus operates normally. However, if the flag is FFh, as in this example when the manufacturer code and device code are not registered in the device ID table 13, the host 15 can only read data from the IC memory device 1. It should be noted that the host 15 can read data from otherwise incompatible IC memory devices because all IC memory devices comprising flash memory use the same command for data read operations.

It should be further noted that the page buffer 5, memory array 6, and Y-gate sense amplifier 7 constitute the memory unit. The status/ID register 9 constitutes an identification information and check results storage unit. The write-state machine 11 functions as a compatibility checking unit, and the table storage unit 14 as a compatibility information storage unit.

The operation whereby the IC memory device 1 shown in FIG. 1 determines whether it is compatible with the host 15 is described in detail below with reference to FIG. 2 which illustrates the flowchart of such operation.

Figure 2:
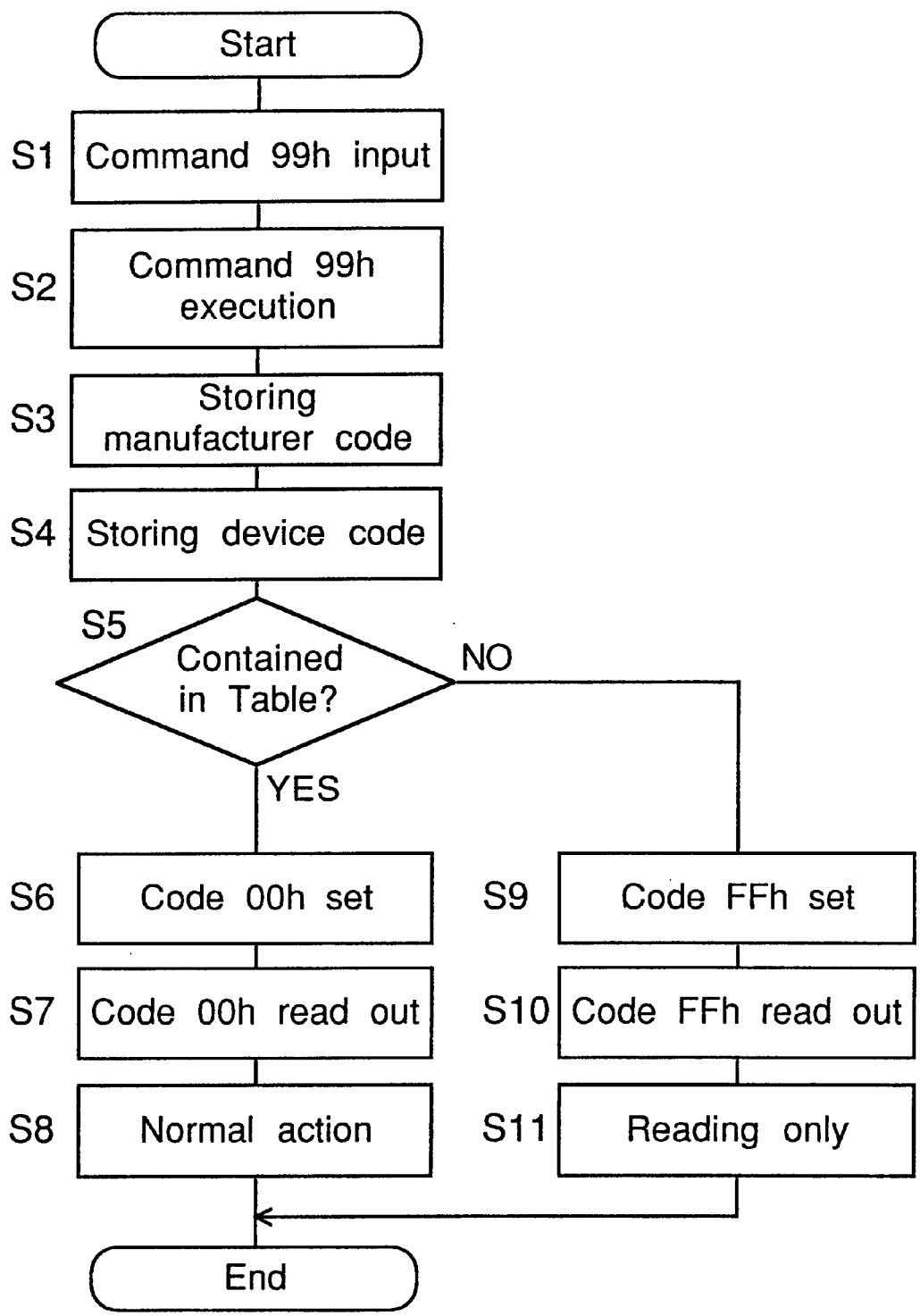
FIG. 2 is a flowchart used to describe an operation of the IC memory device shown in FIG. 1 for determining compatbility with a particular host.

The procedure starts when in step S1 of FIG. 2 the command requesting a compatibility check is supplied to the CUI 10 from the host 15 by means of control signal lines 23 to 27. It is assumed herein that this compatibility check request command is the command value 99h.

At step S2, the CUI 10 instructs the write-state machine 11 to perform the specific compatibility check in accordance with command 99h. The IC memory device 1 then receives an address 000000h via the address bus 21 and a manufacturer code 1Ch via the data bus 22 from the host 15 (step S3). The write-state machine 11 then controls the multiplexer 8 and I/O buffer 12 to store the manufacturer code 1Ch to the status/ID register 9. The status/ID register 9 thus stores the manufacturer code 1Ch to be checked for compatibility.

The IC memory device 1 then receives an address 000001h via the address bus 21 and a device code DAh via the data bus 22 from the host 15 (step S4). The write-state machine 11 then controls the multiplexer 8 and I/O buffer 12 to store the device code DAh to the status/ID register 9. The status/ID register 9 thus also stores the device code DAh to be checked for compatibility.

The write-state machine 11 then determines whether the manufacturer code 1Ch and device code DAh stored to the status/ID register 9 are contained in the device ID table 13 stored in the table storage unit 14 (step S5). If the codes are registered in the device ID table 13, a YES results and the procedure advances to step S6. If the codes are not registered in the device ID table 13, a NO results and the procedure advances to step S9.

If a yes results, the IC memory device 1 is compatible with the host 15. The write-state machine 11 therefore sets a compatibility flag stored in the status/ID register 9 to a specific value indicating that the IC memory is compatible with the host 15. A value of 00h is used in this exemplary embodiment, (step S6).

The host 15 supplies an address, 000002h in this embodiment, indicative of the status/ID register 9 to the address decoder 4 via the address bus 21. The host 15 waits a specific period after supplying the device code DAh before accessing the status/ID register 9. The write-state machine 11 thus reads the compatibility flag from the status/ID register 9, and sends the stored value (00h in this case) to the data bus 22 through the multiplexer 8 and I/O buffer 12 (step S7).

The host 15 thus confirms that the IC memory device 1 is operationally compatible and can be accessed for all normal IC memory operations (step S8). The procedure then ends.

If a no results in step S5 above, the IC memory device 1 is not compatible with the host 15. The write-state machine 11 therefore sets the compatibility flag stored in the status/ID register 9 to a specific value indicating that the IC memory is not compatible with the host 15. A value of FFh is used in this exemplary embodiment, (step S9).

As described above, the host 15 then supplies an address, 000002h in this embodiment, indicative of the status/ID register 9 to the address decoder 4 via the address bus 21. The write-state machine 11 thus reads the compatibility flag from the status/ID register 9, and sends the stored value (FFh in this case) to the data bus 22 through the multiplexer 8 and I/O buffer 12 (step S10).

The host 15 thus confirms that the IC memory device 1 is not operationally compatible and can only be accessed for read operations (step S11). The procedure then ends.

In the procedure shown in FIG. 2, the host 15 supplies an address (000002h) indicative of the status/ID register 9 via the address bus 21 to the IC memory device 1, and thereby reads the compatibility flag set in the status/ID register 9. It is alternatively possible, however, for the host 15 to read the value stored to the status/ID register 9 by issuing a specific compatibility flag read command to the IC memory device 1, and thereby determine the operational compatibility of the IC memory device 1. A flow chart of this procedure is shown in FIG. 3 and described below.

Figure 3:
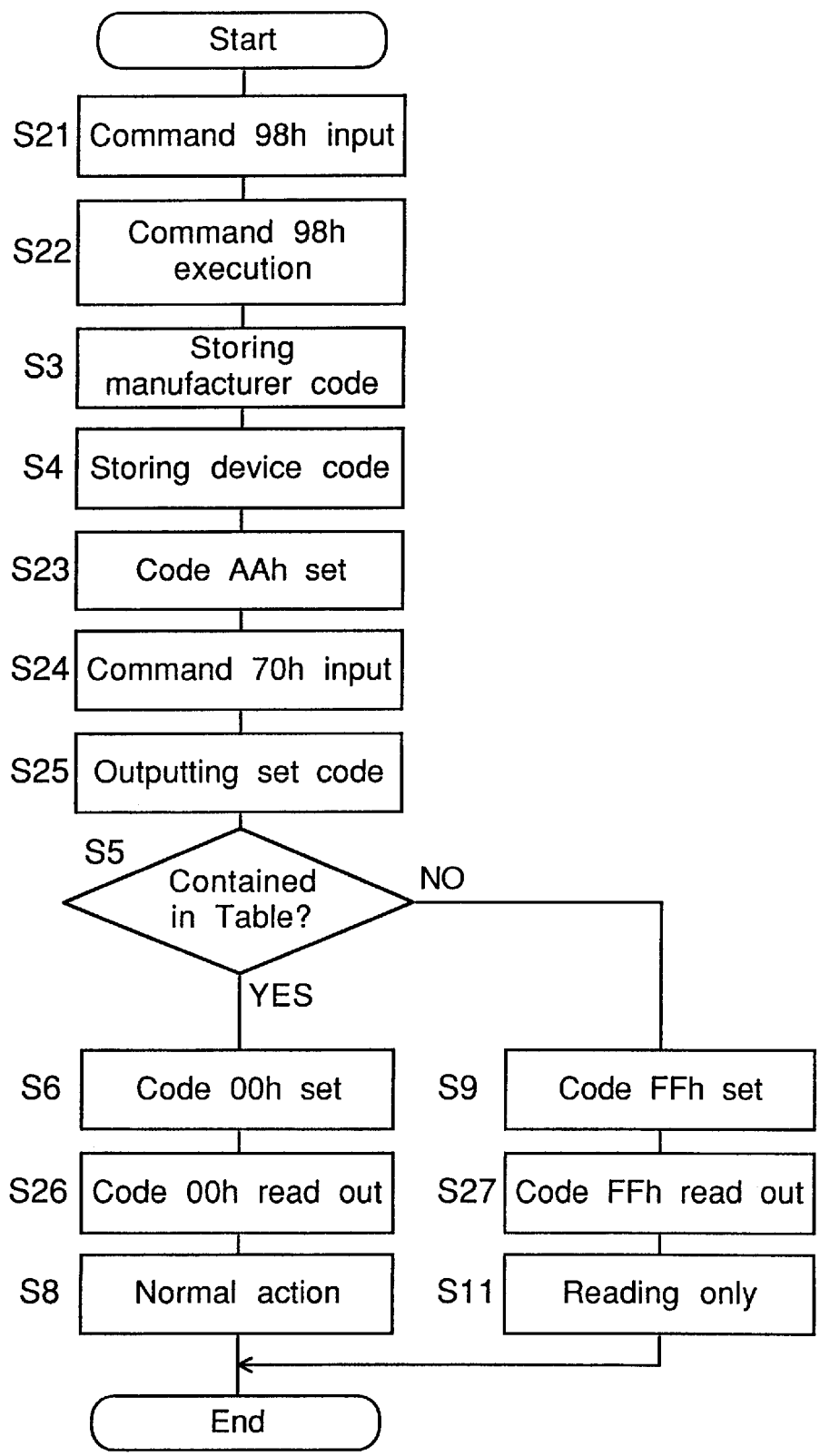
FIG. 3 is a flow chart used to describe an operation of the IC memory device shown in FIG. 1 according to an alternative method for determining compatibility with a particular host.

It should be noted that the same steps in FIG. 2 and FIG. 3 are identified by like reference numerals, and further description thereof is omitted below where only the differences are described.

Referring now to FIG. 3, the procedure starts when in step S21 a command requesting a compatibility check is supplied to the CUI 10 from the host 15 by means of control signal lines 23 to 27. It is assumed herein that this compatibility check request command is the command value 98h.

At step S22, the CUI 10 instructs the write-state machine 11 to perform the specific compatibility check in accordance with command 98h. Steps S3 and S4 as described with reference to FIG. 2 are then executed. The write-state machine 11 then sets the compatibility flag to a value, a value of AAh in this embodiment, in the status/ID register 9 indicating that the compatibility check has not been completed (step S23).

The host 15 next issues a command for reading the compatibility flag from the status/ID register 9 to the CUI 10 via the control signal lines 23 to 27 (step S24). A value of 70h is used for this read command in the present exemplary embodiment.

In response to the read command 70h, the CUI 10 drives the write-state machine 11 to read the compatibility flag from the status/ID register 9 and output it to the data bus 22 through the multiplexer 8 and I/O buffer 12. It should be noted that the host 15 issues the read command repeatedly to read the value stored to the status/ID register 9 until the check is completed and the result of the compatibility check is stored to the status/ID register 9.

The write-state machine 11 then determines whether the manufacturer code 1Ch and device code DAh stored to the status/ID register 9 are contained in the device ID table 13 as described in step S5 above. If the codes are registered in the device ID table 13, a YES results and the procedure advances to step S6. If the codes are not registered in the device ID table 13, a NO results and the procedure advances to step S9.

If the YES results, the compatibility flag is set to 00h as described in step S6 shown in FIG. 2. When the read command 70h is then next received from the host 15, the CUI 10 drives the write-state machine 11 to read the compatibility flag from the status/ID register 9 and outputs it to the data bus 22 through the multiplexer 8 and I/O buffer 12. The host 15 thus confirms that the IC memory device 1 is operationally compatible and can be accessed for all normal IC memory operations (step S8). The procedure then ends.

If a NO results, the compatibility flag is set to FFh as described in step S9 above. When the read command (70h) is then next received from the host 15, the CUI 10 drives the write-state machine 11 to read the compatibility flag from the status/ID register 9 and output it to the data bus 22 through the multiplexer 8 and I/O buffer 12. The host 15 thus confirms that the IC memory device 1 is not operationally compatible and can only be accessed for read operations (step S11). The procedure then ends.

The IC memory device according to a first embodiment of the present invention thus stores the manufacturer code and device code information of operationally compatible IC memory chips in a device ID table 13 stored to an internal table storage unit 14, and can determine whether it is operationally compatible with a connected host 15 by determining whether the manufacturer code and device code information of the host 15 is contained in the device ID table 13. It is therefore not necessary for the host to store a large number of manufacturer codes and device codes, and it is not necessary for the host to determine whether it is compatible with a specific IC memory device connected thereto. As a result, the operation of the host can be simplified.

Embodiment 2

As can be understood from the above description, the write-state machine 11 of an IC memory device 1 according to the first embodiment of the invention stores the result of the compatibility check performed by the write-state machine 11 to the status/ID register 9, and the host 15 then reads the result from the status/ID register 9. It is alternatively possible, however, to convert the check result to a predefined signal and output this signal directly to the host 15. An IC memory device 1 so comprised is described next below in connection with a second embodiment of the present invention.

It should be noted that a typical block diagram of an IC memory device according to this second embodiment is identical to that of the first embodiment shown in FIG. 1 except for the write-state machine 11 and, therefore, the IC memory device 1, which are indicated as write-state machine 31 and IC memory device 30, respectively, below. Only the differences in the IC memory device 30 of the second embodiment are described below.

When the write-state machine 31 determines that the manufacturer code and device code supplied from the host 15 and buffered to the status/ID register 9 are registered in the device ID table 13, it generates and outputs a predefined ready signal RY to the host 15 over the control signal line 28. The host 15 is thereby informed that the IC memory device 30 is compatible, and the IC memory device 30 can proceed to perform such normal operations as data reading, writing, and erasing.

However, if the supplied manufacturer code and device code are not registered in the device ID table 13, the write-state machine 31 generates and outputs a predefined busy signal BY# to the host 15 over the control signal line 28.

If the busy signal BY# is received from the write-state machine 31 by the host 15 without interruption for a specific period of time, the host 15 interrupts the power supply to the IC memory device 30 and stops IC memory device 30 operation. The host 15 thereafter resumes supplying power to the IC memory device 30 and resets the IC memory device 30 for reading only. Note that the write-state machine 31 in this embodiment functions as the compatibility checking unit of the IC memory device 30.

Figure 4:
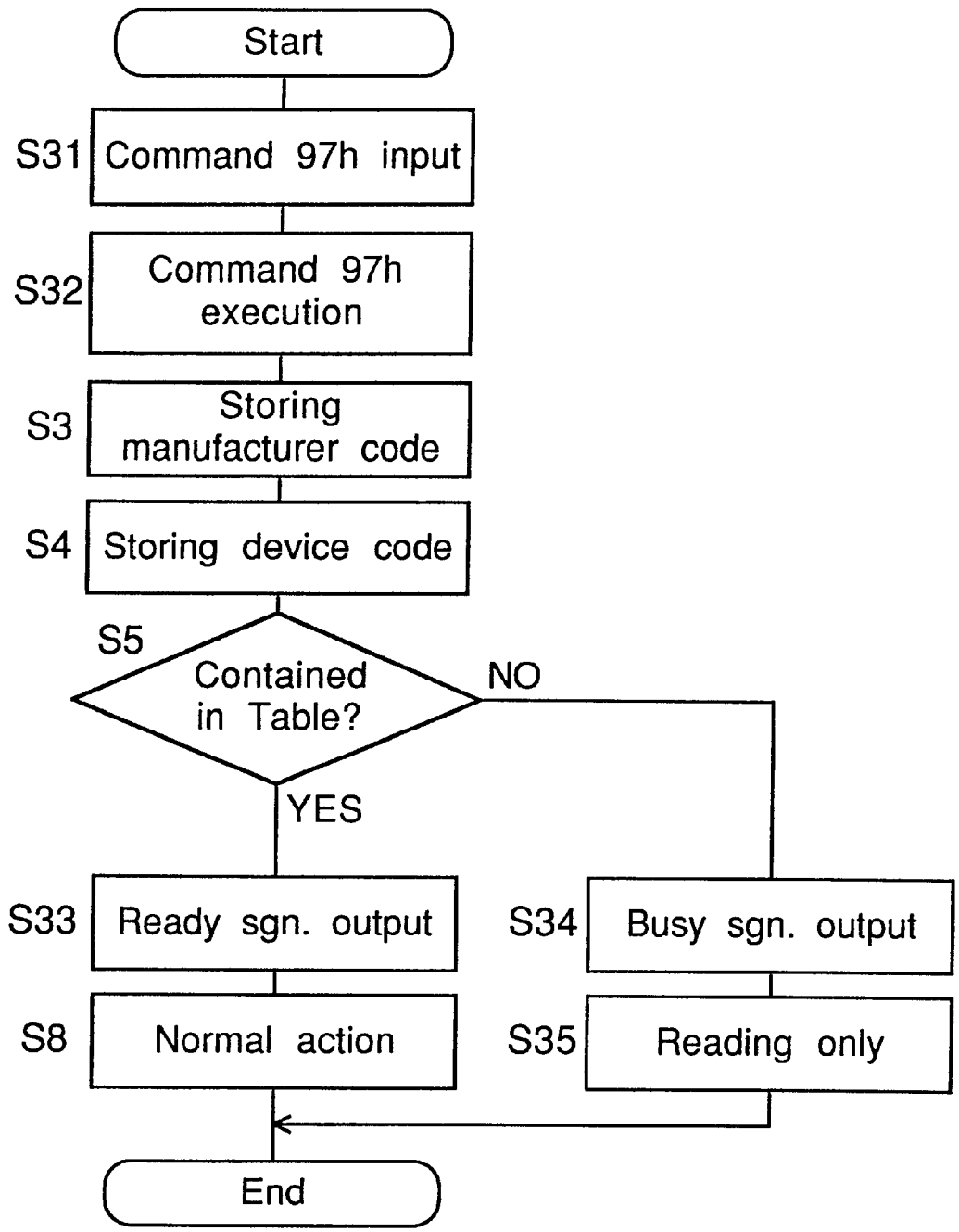
FIG. 4 is a flow chart used to describe the operation of the IC memory according to a second embodiment of the present invention for determining compatibility with a particular host.

FIG. 4 is a flow chart of the operation whereby the IC memory device 30 of this embodiment checks compatibility with a host 15, and is referred to below to describe the operation of the IC memory device 30 according to this second embodiment as described above. It should be noted that the same steps in FIG. 2 and FIG. 4 are identified by like reference numerals, and further description thereof is omitted below where only the differences are described. Note, further, that references to the IC memory device 1 and write-state machine 11 with respect to the flow chart shown in FIG. 2 shall be taken as references to the IC memory device 30 and write-state machine 31 of the present embodiment with respect to the flow chart shown in FIG. 4.

Referring now to FIG. 4, the procedure starts when in step S31 a command requesting a compatibility check is supplied to the CUI 10 from the host 15 by means of control signal lines 23–27. It is assumed herein that this compatibility check request command is the command value 97h.

At step S32, the CUI 10 instructs the write-state machine 31 to perform the specific compatibility check in accordance with command 97h. Steps S3, S4, and S5 as described with reference to FIG. 2 are then executed. If in step S5 the supplied manufacturer code and device code are registered in the device ID table 13, a YES results. This causes the write-state machine 31 to generate and output a ready signal RY over the control signal line 28 to the host 15 (step S33). The host 15 thus confirms that the IC memory device 1 is operationally compatible and can be accessed for all normal IC memory operations (step S8). The procedure then ends.

However, if in step S5 the supplied manufacturer code and device code are not registered in the device ID table 13, a NO results. This causes the write-state machine 31 to generate and output a busy signal BY# over the control signal line 28 to the host 15 (step S34) . If the host 15 continues receiving the busy signal BY# for a specific period of time, it interrupts the power supply to the IC memory device 30 to stop IC memory device 30 operation. The host 15 thereafter resumes supplying power to the IC memory device 30 and resets the IC memory device 30 for reading only (step S35). The procedure then ends.

As with the IC memory device according to the first embodiment above, the IC memory device according to this second embodiment of the invention can also determine whether it is operationally compatible with a connected host 15 by determining whether the manufacturer code and device code supplied from the host 15 are registered in the internal device ID table 13 of compatible devices. In addition, an IC memory device according to this embodiment directly notifies the host 15 of the compatibility check result using a predefined signal.

It is therefore not necessary for the host to store a large number of manufacturer codes and device codes. It is furthermore not necessary for the host to determine whether it is compatible with a specific IC memory device connected thereto. It is also not necessary for the host 15 to perform a separate operation to obtain the result of the compatibility check. As a result, the operation of the host can be simplified even further.

Embodiment 3

As can be understood from the preceding descriptions, the IC memory devices according to the first and second embodiments of the invention use the IC memory device for reading data only when the IC memory device is determined incompatible with the host 15. However, when the IC memory device is incompatible with the host 15, it is also possible for the IC memory device to disable itself in response to all commands from the host 15. The IC memory device so comprised is described next in connection with a third embodiment of the invention.

It should be noted that a typical block diagram of an IC memory device according to this third embodiment is identical to that of the first embodiment shown in FIG. 1 except for the write-state machine 11 and, therefore, the IC memory device 1, which are indicated as write-state machine 41 and IC memory device 40, respectively, below. Only the differences in the IC memory device 40 of the third embodiment are described below.

When the write-state machine 41 determines that the manufacturer code and device code supplied from the host 15 and buffered to the status/ID register 9 are not registered in the device ID table 13, it sets the CUI 10 to a disabled state to stop operation irrespective of the state of the chip enable signal CE# from the host 15. The IC memory device 40 is thus disabled and stops operating. If the manufacturer code and device code supplied from the host 15 are registered in the device ID table 13, the write-state machine 41, the write-state machine 41 does not set the CUI 10 to a disabled state, and the CUI 10 thus operates normally.

The host 15 determines whether normal operation of an IC memory device 40 so comprised is possible by attempting data read and write operations to the IC memory device 40. If the IC memory device 40 responds normally, the host 15 determines that the IC memory device 40 is compatible. As a result, the host 15 treats the IC memory device 40 as compatible memory for normal reading, writing, erasing, and other operations. If the IC memory device 40 does not respond normally to the data read/write commands from the host 15, the host 15 determines the IC memory device 40 incompatible and stops using the IC memory device 40. Note that the write-state machine 41 functions as the compatibility checking unit in this embodiment.

Figure 5:
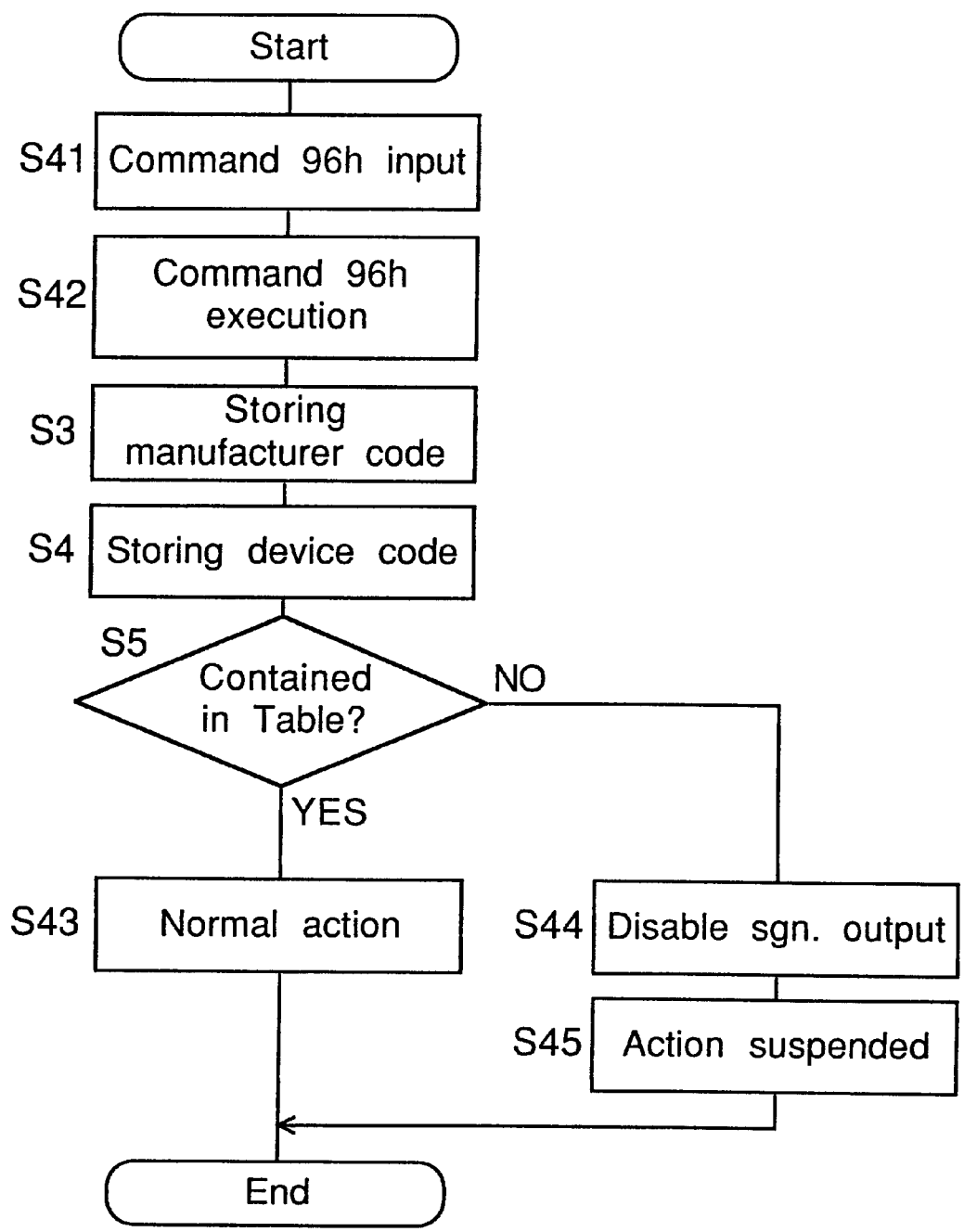
FIG. 5 is a flowchart used to describe the operation of the IC memory according to a third embodiment of the present invention for determining compatibility with a particular host.

FIG. 5 is a flowchart of the operation whereby the IC memory device 40 of this embodiment checks compatibility with a host 15, and is referred to below to describe the operation of the IC memory device 40 according to this third embodiment as described above. It should be noted that the same steps in FIG. 2 and FIG. 5 are identified by like reference numerals, and further description thereof is omitted below where only the differences are described. Note, further, that references to the IC memory device 1 and write-state machine 11 with respect to the flow chart shown in FIG. 2 shall be taken as references to the IC memory device 40 and write-state machine 41 of the present embodiment with respect to the flow chart shown in FIG. 5.

Referring to FIG. 5, the procedure starts when in step S41 a command requesting a compatibility check is supplied to the CUI 10 from the host 15 by means of control signal lines 23 to 27. It is assumed herein that this compatibility check request command is the command value 96h.

At step S42, the CUI 10 instructs the write-state machine 11 to perform the specific compatibility check in accordance with command 96h. Steps S3, S4, and S5 as described with reference to FIG. 2 are then executed. If in step S5 the supplied manufacturer code and device code are registered in the device ID table 13, a YES results. The write-state machine 11 therefore does not apply the signal disabling the CUI 10.

After supplying the device code DAh to the IC memory device 40, the host 15 waits long enough for the compatibility check to be completed before testing whether the IC memory device 40 operates normally in response to commands from the host 15. After confirming normal IC memory device 40 operation (step S43), the host 15 determines the IC memory device 40 to be compatible, and the procedure then ends.

However, if in step S5 the supplied manufacturer code and device code are not registered in the device ID table 13, a NO results. This causes the write-state machine 41 to generate and output to the CUI 10 a specific signal disabling CUI 10 operation (step S44).

After waiting for the compatibility check to be completed as described above, the host 15 tests whether the IC memory device 40 operates normally in response to commands from the host 15. Because the CUI 10 has been disabled by the write-state machine 41 in this case, the IC memory device 40 does not respond (operate) normally in response to the data read/write requests. The host 15 therefore determines the IC memory device 40 to be incompatible, and stops using the IC memory device 40. The procedure then ends.

As with the IC memory devices of the first and second embodiments above, the IC memory device 40 according to this third embodiment of the invention determines whether it is operationally compatible with a connected host 15 by means of an internal comparison of the manufacturer code and device code supplied from the host 15 with the values of compatible devices registered in the internal device ID table 13. In the present embodiment, however, the CUI 10 is set to a disabled state when the IC memory device 40 is determined incompatible with the host 15, and the IC memory device 40 is thereby prevented from operating.

It is therefore not necessary for the host to store a large number of manufacturer codes and device codes. It is furthermore not necessary for the host to determine whether it is compatible with a specific IC memory device connected thereto and, thus, It is also not necessary for the host 15 to perform a separate operation to obtain the result of the compatibility check. As a result, the operation of the host can be simplified even further.

Embodiment 4

In the third embodiment of the invention as described above, the CUI 10 is set to a disabled state when the IC memory device 40 is determined incompatible with the connected host 15, and the IC memory device 40 is thereby disabled, that is, set to a non-operating state. When the IC memory device is not compatible with the host 15, however, it is alternatively possible to prohibit data writing to the memory array 6. An IC memory device so comprised is described next below in connection with a fourth embodiment of the invention.

It should be noted that a typical block diagram of an IC memory device according to this fourth embodiment is identical to that of the first embodiment shown in FIG. 1 except for the write-state machine 11 and, therefore, the IC memory device 1, which are indicated as write-state machine 51 and IC memory device 50, respectively, below. Only the differences in the IC memory device 50 of the fourth embodiment are described below.

When the write-state machine 51 determines that the manufacturer code and device code supplied from the host 15 and buffered to the status/ID register 9 are not registered in the device ID table 13, it sets the CUI 10 to a read-only state to stop write operations irrespective of the state of the write enable signal WE# from the host 15. The IC memory device 50 is thus set to a constant write-prohibit state. If, however, the manufacturer code and device code supplied from the host 15 are registered in the device ID table 13, the write-state machine 51, the write-state machine 41 does not set the CUI 10 to a read-only state, and the CUI 10 thus operates normally.

The host 15 determines whether normal operation of an IC memory device 40 so comprised is possible by attempting a data write operation to the IC memory device 50. If the IC memory device 50 responds normally, the host 15 determines that the IC memory is compatible. As a result, the host 15 treats the IC memory device 50 as compatible memory for normal reading, writing, erasing, and other operations. If the IC memory device 50 does not respond normally to the data read/write commands from the host 15, the host 15 determines the IC memory device 50 incompatible and uses it only for reading data. Note that the write-state machine 51 functions as the compatibility checking unit in this embodiment.

Figure 6:
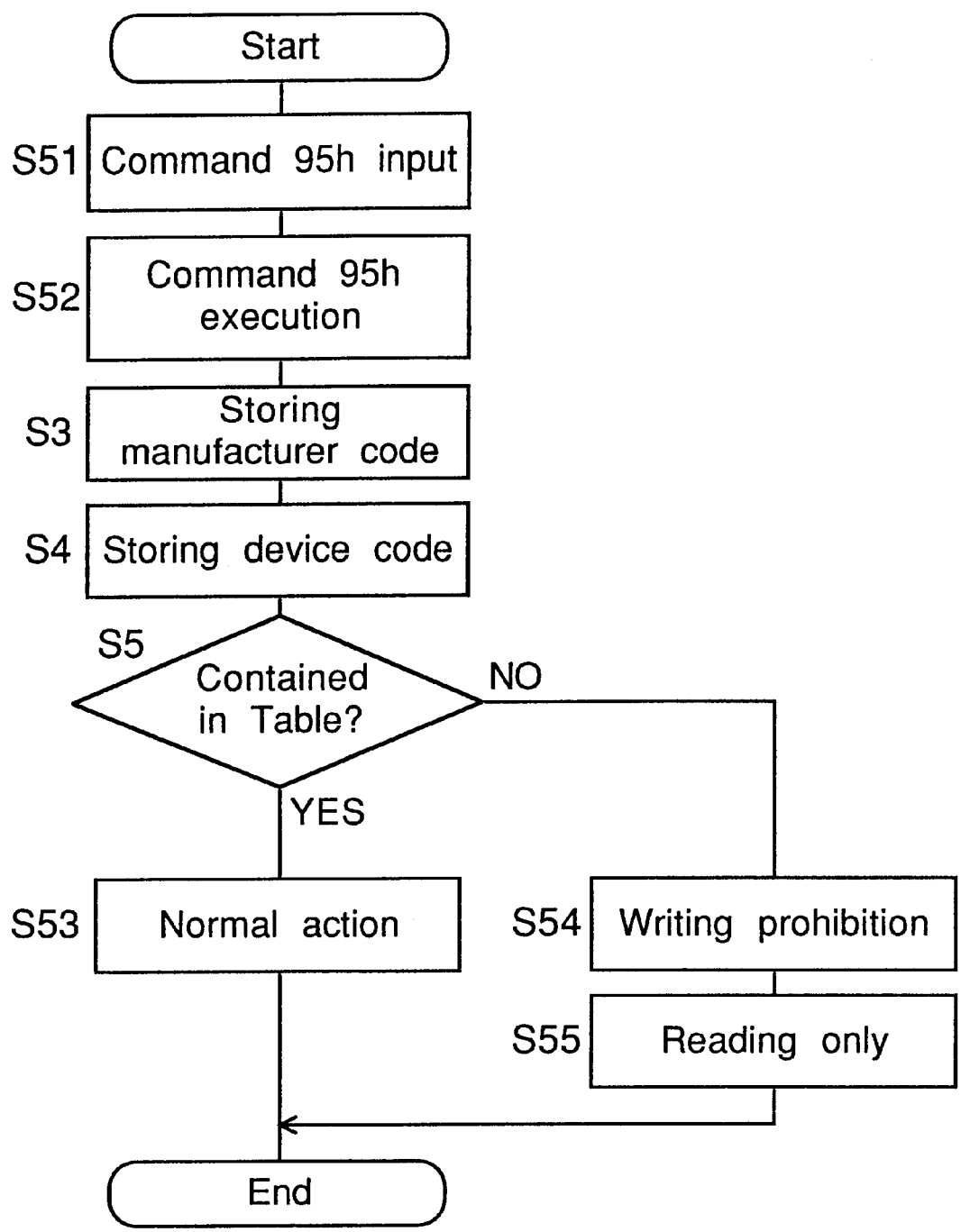
FIG. 6 is a flowchart used to describe the operation of the IC memory according to a fourth embodiment of the present invention for determining compatibility with a particular host.

FIG. 6 is a flowchart of the operation whereby the IC memory device 50 of this embodiment checks compatibility with a host 15, and is referred to below to describe the operation of the IC memory device 50 according to this fourth embodiment as described above. It should be noted that the same steps in FIG. 2 and FIG. 6 are identified by like reference numerals, and further description thereof is omitted below where only the differences are described. Note, further, that references to the IC memory device 1 and write-state machine 11 with respect to the flow chart shown in FIG. 2 shall be taken as references to the IC memory device 50 and write-state machine 51 of the present embodiment with respect to the flow chart shown in FIG. 6.

The procedure starts when in step S51 of FIG. 6 a command requesting a compatibility check is supplied to the CUI 10 from the host 15 by means of control signal lines 23–27. It is assumed herein that this compatibility check request command is the command value 95h. At step S52, the CUI 10 instructs the write-state machine 51 to perform the specific compatibility check in accordance with command 95h. Steps S3, S4, and S5 as described with reference to FIG. 2 are then executed. If in step S5 the supplied manufacturer code and device code are registered in the device ID table 13, a YES results. The write-state machine 51 therefore does not apply the signal to the CUI 10 resulting in a read-only state.

After supplying the device code DAh to the IC memory device 50, the host 15 waits long enough for the compatibility check to be completed before testing whether the IC memory device 50 operates normally in response to commands from the host 15. After confirming normal IC memory device 40 operation (step S53), the host 15 determines the IC memory device 50 to be compatible, and the procedure then ends. However, if in step S5 the supplied manufacturer code and device code are not registered in the device ID table 13, a NO results. This causes the write-state machine 51 to generate and output to the CUI 10 a specific signal enabling only data reading (step S54).

After waiting for the compatibility check to be completed as described above, the host 15 tests whether the IC memory device 50 operates normally in response to a write command from the host 15. Because the CUI 10 has been set to a read-only state by the write-state machine 51 in this case, the IC memory device 50 does not respond (operate) normally in response to data write requests. The host 15 therefore determines the IC memory device 50 to be incompatible, and uses the IC memory device 50 for read operations only. The procedure then ends.

As with the IC memory devices of the first and second embodiments above, the IC memory device 50 according to this fourth embodiment of the invention determines whether it is operationally compatible with a connected host 15 by means of an internal comparison of the manufacturer code and device code supplied from the host 15 with the values of compatible devices registered in the internal device ID table 13. In the present embodiment, however, the CUI 10 is set to a read-only state when the IC memory device 50 is determined incompatible with the host 15, and write operations to the memory array 6 of the IC memory device 50 are thereby prohibited.

It is therefore not necessary for the host to store a large number of manufacturer codes and device codes. It is furthermore not necessary for the host to determine whether it is compatible with a specific IC memory device connected thereto and, thus, it is also not necessary for the host 15 to perform a separate operation to obtain the result of the compatibility check. As a result, the operation of the host can be simplified even further.

Embodiment 5

The device ID table 13 in which the manufacturer and device codes of compatible devices are registered is stored in the table storage unit 14, which is provided separately from the memory array 6 in each of the preceding embodiments. The device ID table 13 can be alternatively stored in the memory array 6, however, and the IC memory device so comprised is described next in connection with a fifth embodiment of the present invention.

Figure 7:
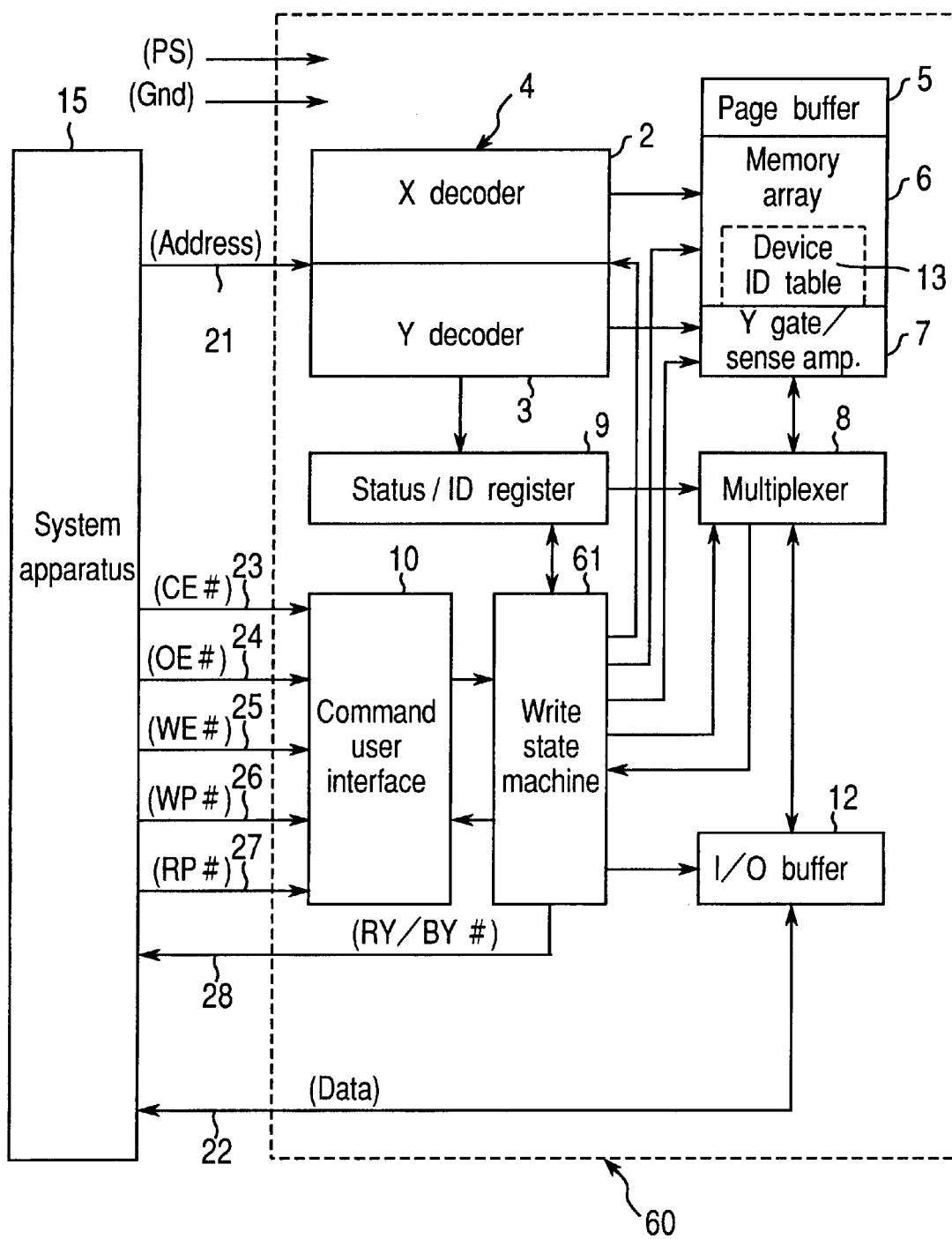
FIG. 7 is block diagram of the IC memory exemplary of a fifth embodiment of the present invention.

FIG. 7 is a typical block diagram of an IC memory device 60 according to a fifth embodiment of the present invention. Note that like parts in FIG. 1 and FIG. 7 are identified by like reference numerals, and further description thereof is omitted below, where only the differences are described.

As will become obvious from the figures, the IC memory device 60 of the fifth embodiment differs by eliminating the table storage unit 14 shown in FIG. 1 and storing the device ID table 13 in the memory array 6, and in the operation of the write-state machine 11 shown in FIG. 1. That is, the write-state machine 61 of the present embodiment controls the X decoder 2 and Y decoder 3 according to a command from the host 15, and reads data from the device ID table 13 by accessing the memory array 6 using the address at which the device ID table 13 is stored in the memory array 6.

As shown in FIG. 7, the CUI 10 is connected to the write-state machine 61, and the write-state machine 61 is connected to the address decoder 4, Y-gate sense amplifier 7, multiplexer 8, status/ID register 9, and I/O buffer 12. The write-state machine 61 also outputs a specific ready signal RY or busy signal BY# to the host 15 using control signal line 28.

An operation whereby this IC memory device 60 determines compatibility with a host 15 is described next below.

The CUI 10 drives the write-state machine 61 according to the command(s) indicated by the control signal(s) supplied via the control signal lines 23 to 27. The write-state machine 61 thus initiates operation as instructed by the CUI 10, and appropriately drives the address decoder 4, Y-gate sense amplifier 7, multiplexer 8, status/ID register 9, and I/O buffer 12. When the host 15 issues a command requesting the CUI 10 to perform the identification operation used for a compatibility check, the CUI 10 operates the write-state machine 61 to perform the specific compatibility check.

The write-state machine 61 stores the manufacturer code and device code input from the data bus 22, I/O buffer 12, and multiplexer 8 to the status/ID register 9. The device ID table 13 is previously stored at a specific address in the memory array 6. The write-state machine 61 also applies a signal to the address decoder 4 prohibiting operation of the X decoder 2 and Y decoder 3, and applies a signal to the I/O buffer 12 prohibiting I/O buffer 12 operation. As a result, any address data supplied from the host 15, and any data input to the I/O buffer 12, is thereafter ignored until the write-state machine 61 completes the compatibility check.

The write-state machine 61 then sequentially sends an address signal for reading the device ID table 13 in the memory array 6 to the memory array 6 and Y-gate sense amplifier 7, and thereby sequentially reads data from the device ID table 13 to the multiplexer 8. The write-state machine 61 determines whether the manufacturer code and device code buffered to the status/ID register 9 from the host 15 are found in the data read sequentially from the device ID table 13. If the received manufacturer code and device code are registered in the device ID table 13, the write-state machine 11 sets a specific flag, such as 00h, in the status/ID register 9; if the codes are not contained, the write-state machine 11 sets a different specific flag, such as FFh, in the status/ID register 9.

The host 15 then simply reads the flag set to the status/ID register 9. If the read flag is 00h, in this example, the host 15 knows that the IC memory device 1 is compatible IC memory and thus operates normally. However, if the flag is FFh, as in this example when the manufacturer code and device code are not registered in the device ID table 13, the host 15 can only read data from the IC memory device 1. Note that in this embodiment the memory array 6 functions as a compatibility information storage unit, and the write-state machine 61 functions as a compatibility checking unit.

Figure 8:
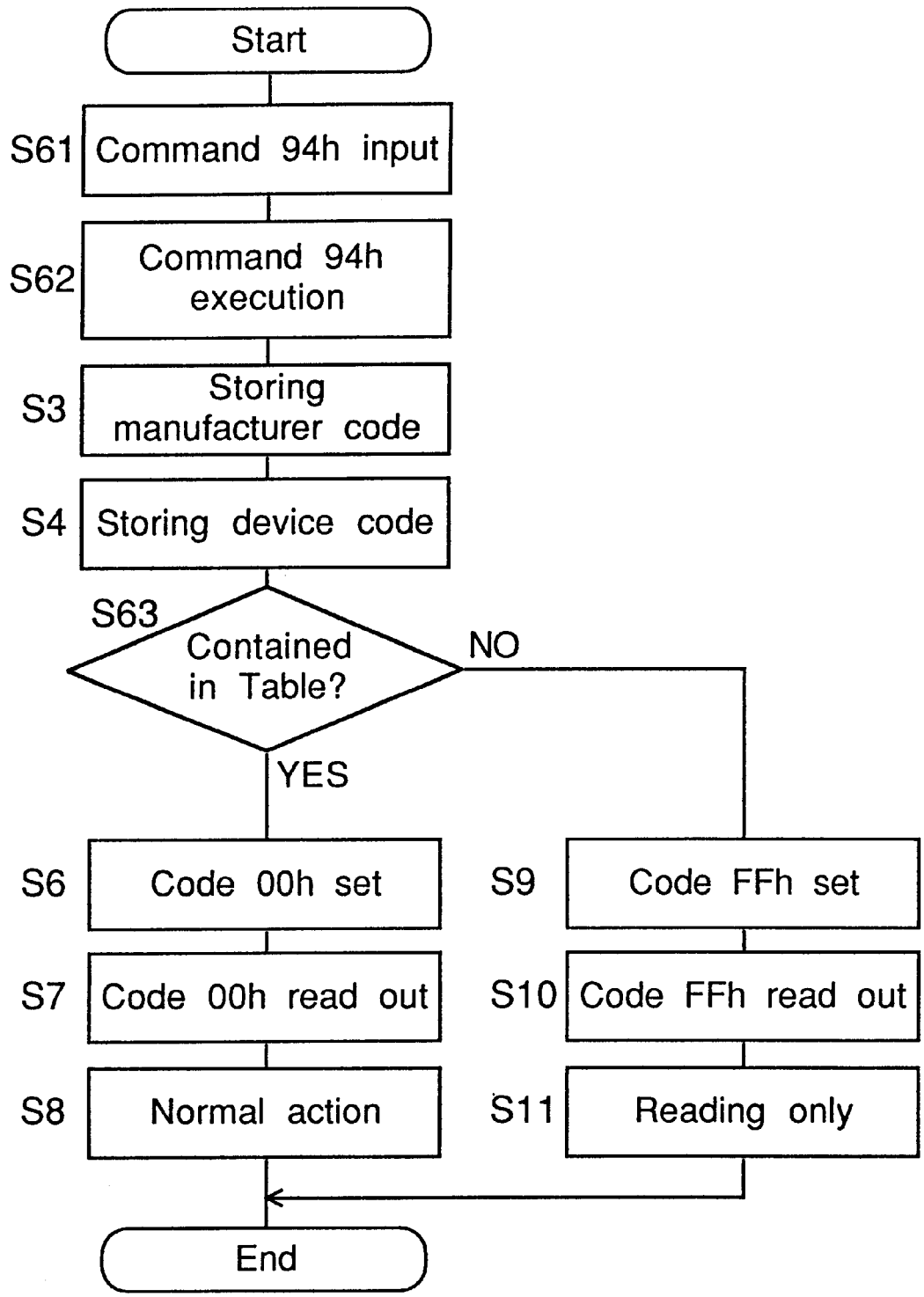
FIG. 8 is a flowchart used to describe an operation of the IC memory shown in FIG. 7 for determining compatibility with a particular host.
Figure 9:
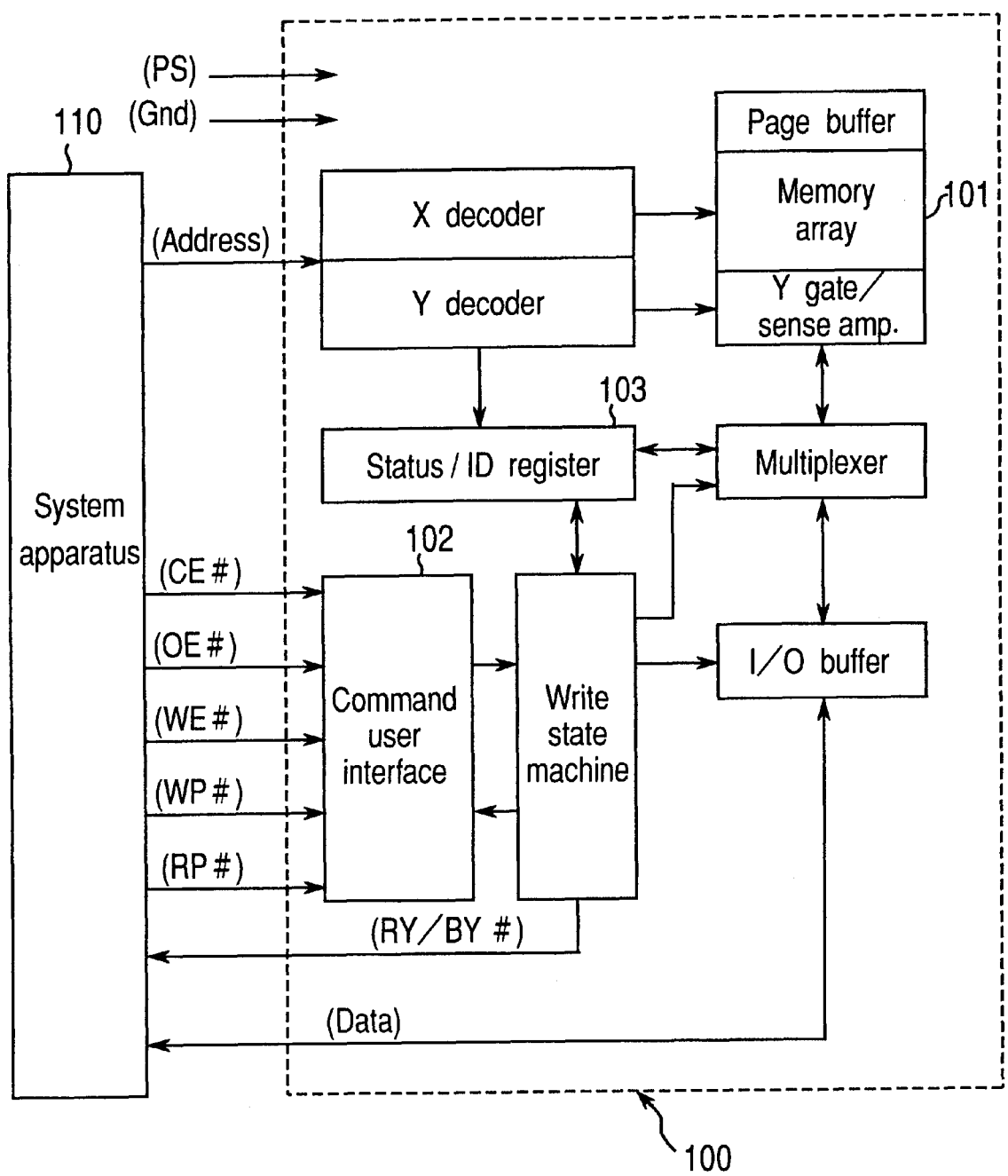
FIG. 9 is a block diagram of the prior art IC memory.

The operation whereby the IC memory device 60 shown in FIG. 7 determines whether it is compatible with the host 15 is described in more detail below with reference to FIG. 8 which illustrates a flowchart of such operation. It should be noted that the same steps in FIG. 2 and FIG. 8 are identified by like reference numerals, and further description thereof is omitted below where only the differences are described. Note, further, that references to the IC memory device 1 and write-state machine 11 with respect to the flow chart shown in FIG. 2 shall be taken as references to the IC memory device 60 and write-state machine 61 of the present embodiment with respect to the flow chart shown in FIG. 8.

The procedure starts when in step S61 of FIG. 8 a command requesting a compatibility check is supplied to the CUI 10 from the host 15 by means of control signal lines 23 to 27. It is assumed herein that this compatibility check request command is the command value 94h.

At step S62, the CUI 10 instructs the write-state machine 61 to perform the specific compatibility check in accordance with command 94h. Steps S3 and S4 as described with reference to FIG. 2 are then executed. The write-state machine 61 then determines whether the manufacturer code 1Ch and device code DAh stored to the status/ID register 9 are contained in the device ID table 13 read from the memory array 6. If the codes are in the device ID table 13, compatibility is confirmed and a YES is returned. Steps S6 to S8 in FIG. 2 are then executed and the procedure ends.

If the codes are not in the device ID table 13, a NO is returned. Steps S9 to S11 in FIG. 2 are then executed and the procedure ends. It is therefore possible with the IC memory device according to a fifth embodiment of the present invention to store the manufacturer code and device code information of operationally compatible IC memory chips in a device ID table 13 stored in the internal memory array 6. Using this device ID table 13, the IC memory device 60 can determine whether it is operationally compatible with a connected host 15 by determining whether the manufacturer code and device code information of the host 15 is contained in the device ID table 13. As a result, it is not necessary to provide a separate memory unit for storing the device ID table 13 in an IC memory device according to the fifth embodiment of the invention.

It is also not necessary for the host to store a large number of manufacturer codes and device codes, and it is not necessary for the host to determine whether it is compatible with a specific IC memory device connected thereto. As a result, the operation of the host can be simplified. It should be further noted that the manufacturer and device codes are described in each of the preceding embodiments as being stored in the device ID table 13 for a plurality of compatible IC memory chips, but the invention shall not be so limited.

More specifically, it is possible to not store manufacturer and device codes in the device ID table 13, and it is possible to store manufacturer and device codes for only a subset of all compatible IC memory chips. For example, it is possible to store manufacturer and device codes for compatible IC memory chips from only a single manufacturer. In this case, however, there is a greater potential for the IC memory device to determine that it is incompatible with a specific host 15 even though it is actually compatible.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An IC memory device comprising command-controllable memory where the IC memory device is controlled by a host system, said IC memory device comprising:
   a compatibility information storage unit in which compatibility information is prestored, said compatibility information including information identifying one or more operationally compatible IC memory chips;
   an identification information storage unit storing IC memory identification information supplied from a host system;
   a compatibility checking unit determining compatibility of the IC memory device with host system operation by determining whether the identification information stored to the identification information storage unit is contained in the compatibility information; and
   a compatibility check result storage unit storing the result determined by the compatibility checking unit;
   wherein the compatibility checking unit outputs a disable signal that suspends action of said command controllable memory when IC memory operation is determined not compatible with the host system.

2. A command-controllable IC memory device comprising a memory unit storing data from a host system where the IC memory device is controlled by the host system, said IC memory device comprising:
   a compatibility information storage unit in which compatibility information is prestored, said compatibility information including information identifying one or more operationally compatible IC memory chips;
   an identification information storage unit storing IC memory identification information supplied from a host system; and
   a compatibility checking unit determining compatibility with host system operation by determining whether the identification information stored to the identification information storage unit is contained in the compatibility information,
   wherein the compatibility checking unit enables data to be only read from the memory unit when IC memory operation is determined not compatible with the host system.

3. The IC memory device as set forth in claim 2,
   wherein the compatibility checking unit supplies a specific signal based on a result of a compatibility check to the host system.

4. The IC memory device as set forth in claim 2,
   wherein the compatibility checking unit stops operation of the memory unit when IC memory operation is determined not compatible with the host system.

5. The IC memory device as set forth in claim 2, wherein the compatibility checking unit outputs a busy signal when IC memory operation is determined not compatible with the host system.

6. The IC memory device as set forth in claim 2,
   wherein the compatibility information storage unit is provided in the memory unit,
      the compatibility checking unit determines compatibility with host system operation by reading compatibility information from the memory unit, and determining whether the identification information stored to the identification information storage unit is contained in the compatibility information.

7. An operational compatibility checking method for a command-controllable IC memory device comprising a memory unit storing data from a host system where the IC memory device is controlled by the host system, said compatibility checking method comprising the steps of:
   supplying IC memory identification information from a host system;
   determining whether said supplied identification information is contained in predefined compatibility information, said compatibility information including information identifying one or more operationally compatible IC memory chips; and determining compatibility with the host system based on the result of determining whether the supplied identification information is contained in the predefined compatibility information, wherein data can only be read from the memory unit when IC memory operation is determined not compatible with the host system.

8. The operational compatibility checking method as set forth in claim 7, further comprising supplying the result of a compatibility check to the host system in response to a request from the host system.

9. The operational compatibility checking method as set forth in claim 7, further comprising supplying a specific signal based on a result of a compatibility check to the host system.

10. The operational compatibility checking method as set forth in claim 7, further comprising stopping operation of the memory unit when IC memory operation is determined not compatible with the host system.

11. The operational compatibility checking method as set forth in claim 7, further comprising outputting a busy signal when IC memory operation is determined not compatible with the host system.

12. A method for checking compatibility of an IC memory device comprising command-controllable memory where the IC memory device is controlled by a host system, said IC memory device comprising the steps of:

prestoring compatibility information including information identifying one or more operationally compatible IC memory chips;

storing IC memory identification information supplied from a host system;

determining whether the stored IC memory identification information is contained in the compatibility information and outputting a compatibility check result based on said determination;

outputting both a disable signal that suspends action of the command-controllable memory device when IC memory operation is determined not compatible with the host system.

* * * * *